April 9, 1963 R. G. ALTHERR 3,084,767
MECHANICAL AND FLUID PRESSURE ACTUATED BRAKE ARRANGEMENT
Original Filed Jan. 16, 1958 4 Sheets-Sheet 1
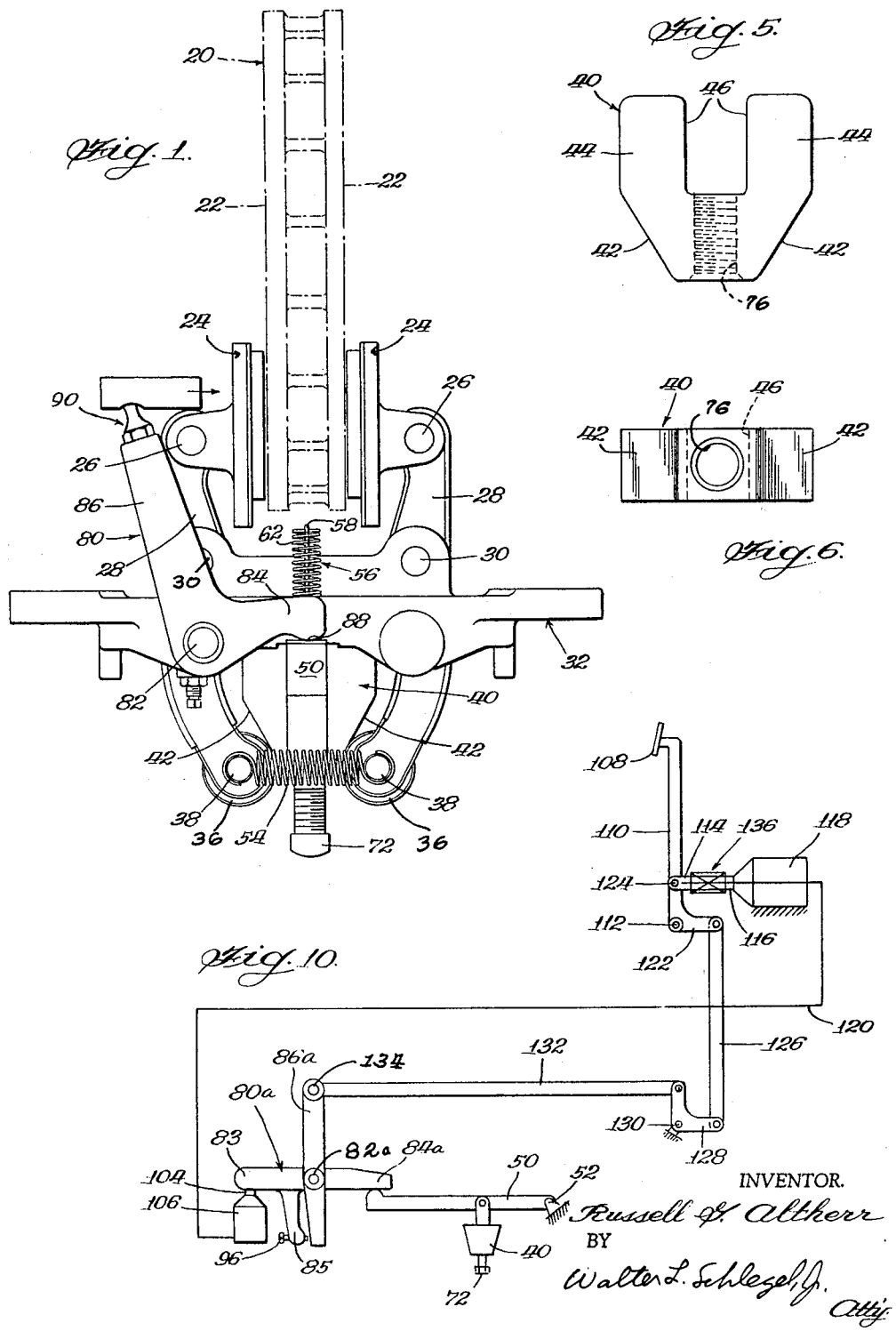
INVENTOR.
Russell G. Altherr
BY
Walter L. Schlegel, Jr.
Atty.

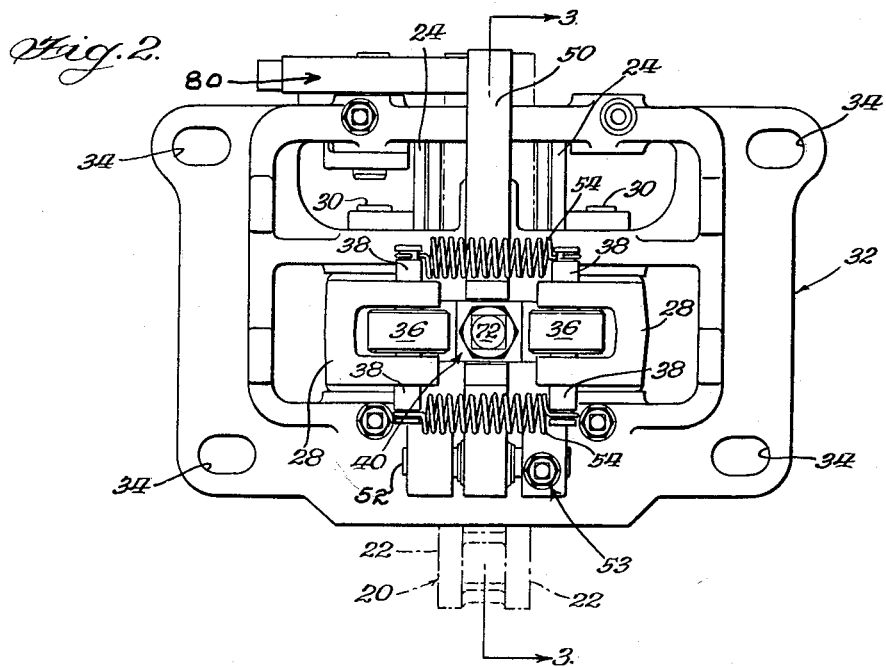

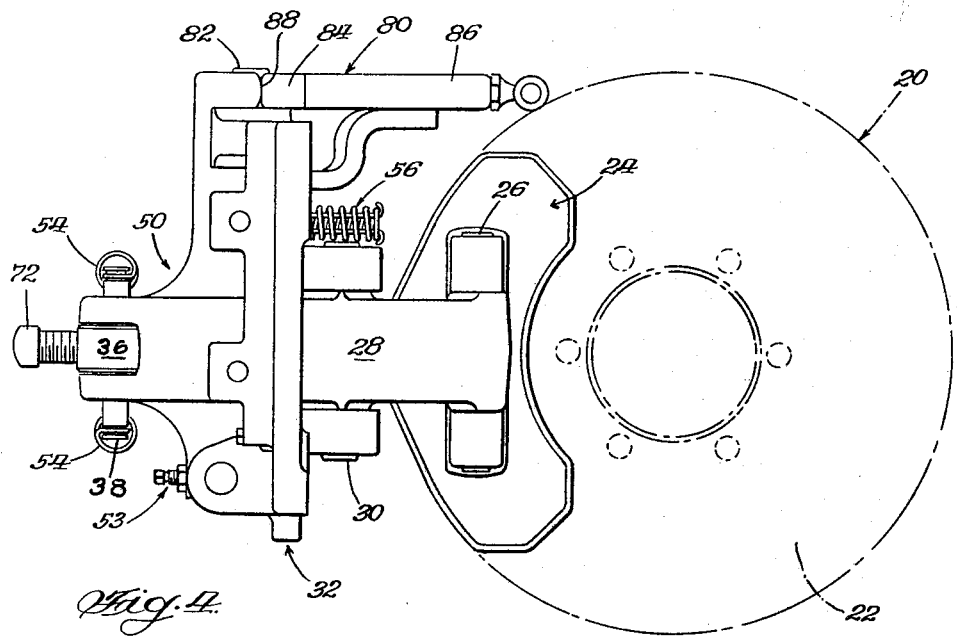

April 9, 1963 R. G. ALTHERR 3,084,767
MECHANICAL AND FLUID PRESSURE ACTUATED BRAKE ARRANGEMENT
Original Filed Jan. 16, 1958 4 Sheets-Sheet 4
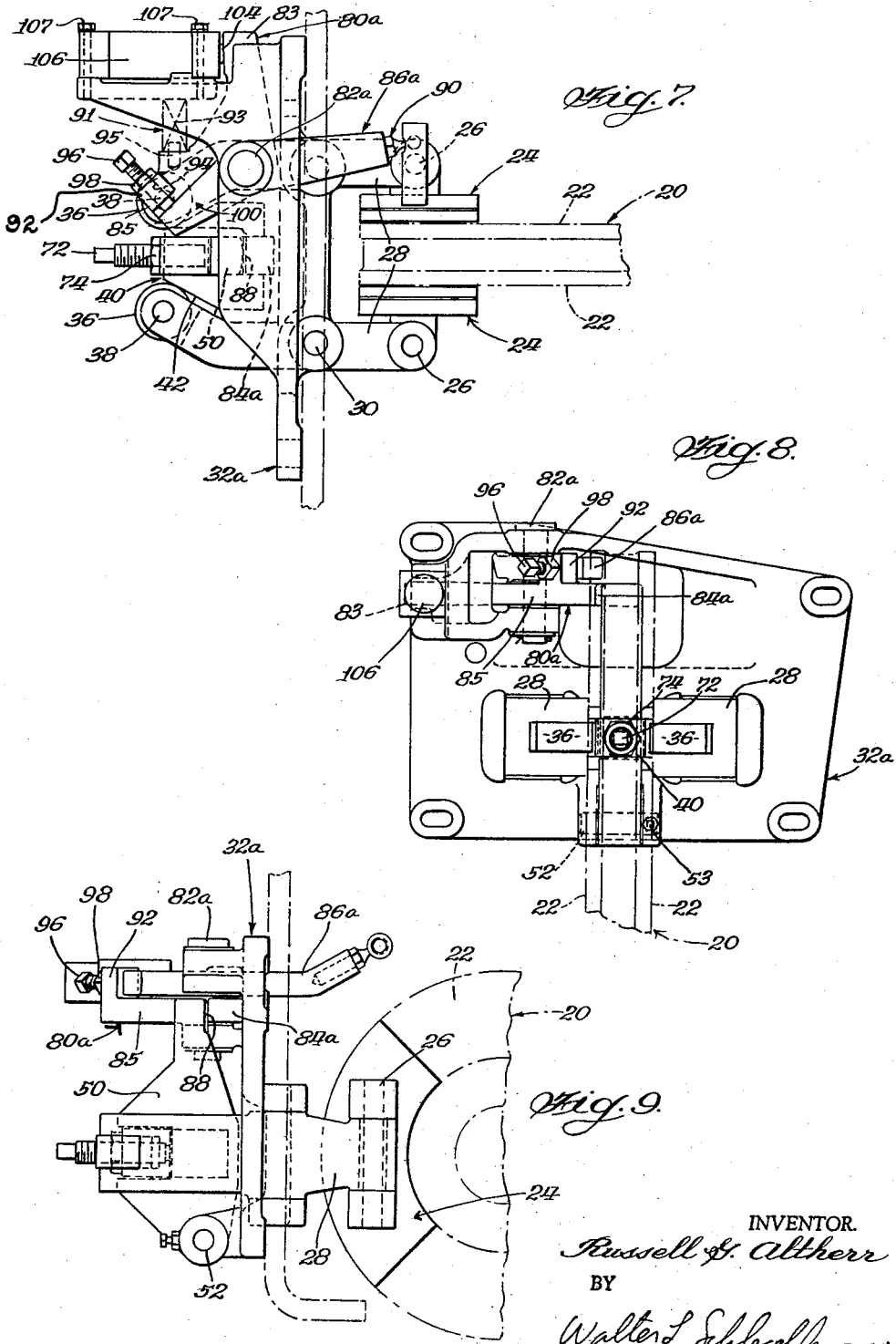
INVENTOR.
Russell G. Altherr
BY
Walter L. Schlegel Jr. Atty.

United States Patent Office 3,084,767
Patented Apr. 9, 1963

3,084,767
MECHANICAL AND FLUID PRESSURE ACTUATED BRAKE ARRANGEMENT
Russell G. Altherr, Hazel Crest, Ill., assignor to American Steel Foundries, Chicago, Ill., a corporation of New Jersey
Original application Jan. 16, 1958, Ser. No. 709,356, now Patent No. 2,979,164, dated Apr. 11, 1961. Divided and this application Oct. 21, 1959, Ser. No. 853,435
4 Claims. (Cl. 188—106)

This invention relates to brake arrangements and more particularly to a self-contained rotor brake arrangement for a vehicle, and is a division of my earlier parent application bearing Serial No. 709,356, filed January 16, 1958, now Patent No. 2,979,164.

The invention comprehends a self-contained rotor brake arrangement adapted for application to or removal from a vehicle or other device as an integral unit or package.

An object of the invention is to provide a rotor brake arrangement adapted for actuation by both fluid pressure and mechanical linkage means, whereby in the event of failure of the fluid pressure system the brakes are actuated by the mechanical linkage system.

A further object of the invention is to provide a rotor brake arrangement wherein both fluid pressure and mechanical means can be used in cooperation with each other to effect the application of a parking brake.

A more specific object of the invention is to provide an override assembly that will limit the pressure applied to the brake by the fluid pressure system and thereby accommodate the concurrent use of the mechanical linkage system to apply the parking brake.

These and other objects of the invention will be apparent from an examination of the following description and drawings, wherein:

FIGURE 1 is a fragmentary top plan view of a brake arrangement, embodying features of the invention;

FIGURE 2 is a front elevational view of the structure, illustrated in FIGURE 1;

FIGURE 3 is a fragmentary vertical sectional view taken on line 3—3 of FIGURE 2;

FIGURE 4 is a side elevational view of the structure, illustrated in FIGURE 1;

FIGURES 5 and 6 are top plan and front elevational detail views, respectively, of the floating wedge element illustrated in FIGURES 1–4;

FIGURES 7–9 correspond to FIGURES 1, 2, and 4, respectively, but illustrate a modified form of the invention;

FIGURE 10 is a schematic diagram illustrating a linkage arrangement adapted for use with the embodiment of the invention illustrated in FIGURES 7–9, and FIGURE 11 is a fragmentary side elevational view, with portions of the structure shown in vertical section, of an override assembly adapted for use with the embodiment of the invention illustrated in FIGURES 7–9.

It will be understood that certain elements have been intentionally eliminated from certain views, for the purpose of clarity, where they are believed to be shown to better advantage in other views.

Referring now to the drawings and particularly to FIGURES 1 through 4 for better understanding of the invention, it will be seen that the brake arrangement illustrated therein includes a rotatable friction member such as a rotor or disk 20 presenting axially spaced opposed friction surfaces 22 and which may be mounted on for rotation with either a wheel and axle assembly or a drive shaft assembly of the vehicle to which the brake is applied. The structural details of the mounting arrangement have not been illustrated in detail as they do not form an essential feature of the invention.

Deceleration of the rotor is achieved by a pair of brake or friction shoe assemblies 24, engageable with respective friction surface 22.

Brake shoe assemblies 24 may be pivotally connected by pins 26 to corresponding rearward ends of a pair of preferably horizontally disposed dead brake levers 28 fulcrumed intermediate their ends by pins 30 to a brake frame 32, which in turn may be detachably mounted in any desired manner (not shown) to a frame (not shown) of the vehicle to which the brake is applied. The mounting of the brake frame 32 to the vehicle frame may be accomplished by means of nut and bolt assembly (not shown) extending through slots or apertures 34 located at the four corners of the frame.

Pivotally mounted on the forward ends of the respective brake levers by preferably vertically extending parallel pins 38 are a pair of rollers 36.

Actuation of the levers is achieved by means of a floating wedge or wedge element, indicated generally at 40, which presents forwardly converging, preferably vertical surfaces 42 engageable with rollers 36 of the respective brake levers. Wedge 40 is bifurcated, as seen in FIGURE 5, and has a pair of arms 44, defining an opening 46 therebetween.

As best seen in FIGURE 3, wedge 40 is carried within a slot or opening 48, presented on the forward side of a preferably vertically extending dead operating lever 50, fulcrumed at its lower end by pin 52 to brake frame 32. Pin 52 may be retained in position by a set screw assembly, indicated generally at 53. It will be seen in FIGURE 2 that the pivotal connection between frame 32 and lever 50 affords sufficient clearance on either side of the lever to permit limited axial or lateral movement of the lever on pin 52 relative to the frame.

Referring again to FIGURE 3, it will be seen that the wedge is disposed within slot 48 on lever 50 with arms 44 of the wedge disposed on opposite sides of the lever, so that the lever is also disposed within opening 46 of the wedge. Thus, it is apparent that wedge 40, although in interlocking relationship with the lever, is entirely a free floating element, having no positive connection to lever 50 or to any other element of the brake mechanism. Although its rearward movement is limited by the forward surface 78 of the slot in lever 50 and its forward movement is limited by rollers 36, the wedge is free for limited movement, both in horizontal and vertical planes relative to lever 50. Because of this free floating condition, the wedge is more or less self-aligning, relative to the rollers 36; thus, line contact between the rollers and the wedge is achieved, and also the braking pressures applied to the respective levers is self-equalizing, even though the wear on the separate brake shoes may be uneven.

A single or pair of tension springs 54, located between the brake levers and preferably located above and below the wedge and having their opposite corresponding ends secured to opposite ends of the respective pins 38, provide a release means to maintain the forward ends of the brake levers and their related brake shoes away from the friction surfaces of the rotor when the brake is in a non-applied or inoperative position.

If desired, an additional release spring mechanism, indicated generally at 56, may be provided in association with the operating lever 50. This mechanism as best seen in FIGURE 3, comprises a plunger 58, having one end disposed to extend through aperture 60 of brake frame 32 for engagement with the lever and a coil compression spring 62 compressed between the brake frame and a lip 64 presented by the other end of the plunger. The opposite end of the plunger is preferably formed with a loop portion 66 which is disposed to extend into a recess 68 presented by the lever and wherein it is engaged by a pin 70 formed on the lever and extending through the loop portion.

To facilitate adjustment of both brake levers and compensate for the wear of the friction elements carried thereby, wedge 40 is provided with a set screw 72 and lock nut 74. Screw 72 is disposed to extend through a central aperture 76 of the wedge is threadable engagement therewith and presents an inner end disposed to abut a forward surface 78, presented by slot 48 of operating lever 50. Thus, as the friction elements wear down, the slack in the linkage may be taken up simply by loosening nut 74, turning screw 72 until the wedge is moved forward toward the related brake lever ends the desired distance, and, then tightening nut 74. In this way, both brake levers are adjusted at the same time, and, as the distance between the line of contact or engagement between the wedge and the respective rollers and the fulcrum points of the respective brake levers remains equal, the equality brake pressures applied by the respective friction shoes to the opposite sides of the rotor will be maintained.

Again referring to FIGURES 1 and 3, it will be seen that the upper end of operating lever 50 is actuated by a preferably horizontally disposed bell crank shaped actuating lever 80, fulcrumed intermediate its ends by pin 82 to brake frame 32. Lever 80 is provided with a pair of angularly related, inboardly and rearwardly extending arms 84 and 86, respectively. Arm 84 is disposed for abuttable engagement with a boss 88, presented by the rear side of the upper end of lever 50, and and arm 86 is disposed for operative connection to a power source (not shown), in any desired manner such as by ball joint connection 90.

In the operation of the device, it will be understood that as lever 80 is actuated by the power source, it is caused to rotate in a clockwise direction, as seen in FIGURE 1, about pivot pin 82, with arm 84 engaging operating lever 50 and causing it to rotate in a clockwise direction, as seen in FIGURE 3, about pivot pin 52. As lever 50 rotates, it urges wedge 40 toward rollers 36 of the respective brake levers, causing the levers to rotate in opposite directions about their respective pivot pins 30 and move their related brake shoes into engagement with opposite sides of the rotor.

FIGURES 7-9 illustrate a modified form of the invention, wherein the brake linkage is adapted for actuation by either or both mechanical linkage and hydraulic means. Much of the structure illustrated in FIGURES 7-9, is similar to that illustrated in FIGURES 1-4 and therefore, where practical, the same or similar numerals have been employed to designate elements corresponding to those of the first described embodiment.

Referring first to FIGURE 7, it will be seen that a pair of brake levers 28, fulcrumed intermediate their ends by pins 30 to a modified brake frame 32a, have at their rearward ends brake shoe assemblies 24, engageable with opposed friction surfaces 22, presented by a rotor 20. At their forward ends brake levers 28 have pivotally connected thereto, by pins 38, a pair of rollers 36 engageable with a floating wedge element 40 which is carried by an operating lever 50, fulcrumed at its lower end by pin 52 to a brake frame 32a.

Lever 50 is actuated by a preferably horizontally disposed vertically offset actuating lever 80a fulcrumed by pin 82a to brake frame 32a.

As best seen in FIGURE 7, lever 80a is in the nature of a bell crank shaped lever, but is provided with three integral arms 83, 84a, and 85, extending outboardly, inboardly and forwardly respectively, relative to pivot pin 82a. Inboardly extending arm 84a is engageable with boss 88 presented by the upper end of operating lever 50. Forwardly extending arm 85 is provided with a vertically offset portion or lug 92, having a threaded aperture 94, extending therethrough, in which is threadably disposed a set screw 96, having a lock nut 98 thereon. The inboard end of screw 96 is abuttably engageable with the forward end 100 of a preferably horizontal dead power lever 86a fulcrumed intermediate its ends by common pivot pin 82a to brake frame 32a and having at its rearward end, a connection of any type, such as ball joint connection 90, with a preferably mechanically actuated power source, not shown on FIGURE 7 but illustrated and described in connection with FIGURE 10. The free end of outboardly extending arm 83 of actuating lever 80a is disposed for abuttable engagement with piston 104 of a power cylinder 106, mounted on brake frame 32a in any desired manner, as by bolts 107.

It is contemplated that under normal operating conditions, actuating lever 80a will be operated by the power cylinder and piston and, in turn, cause operating lever 50 and brake levers 28 to rotate on the respective axes and bring the friction shoes into engagement with the rotor in the same manner as described in connection with the previously mentioned embodiment. To return the brake levers to inoperative position, brake release spring assembly 91 is provided and comprises a coil compression spring 93 and a plunger 95 interposed between brake frame 32a and arm 85 of lever 80a.

In order to utilize the power cylinder as the primary power source for lever 80a, adjustment screw 96 is unscrewed and locked in place by nut 98 to provide a gap or space between the inboard end of the screw and the forward end of lever arm 85, when the brake is in applied position. This gap permits the power cylinder 106 of the hereinafter described hydraulic system to function for normal service applications of the brake, while the mechanical system remains unloaded.

Now, turning to FIGURE 10, wherein is illustrated by a schematic diagram both the mechanical and fluid pressure systems adapted to actuate the brake mechanism, it will be seen that as foot pedal 108 is depressed, lever 110 rotates clockwise about pivot 112 and urges push rod 114 to the right. This action moves the push rod and the override assembly, hereinafter described in greater detail, and compresses piston 116 of master hydraulic or pneumatic cylinder 118, causing the cylinder to transmit hydraulic or pneumatic pressure fluid through line 120 to power cylinder 106. As power cylinder 106 is thus energized, piston 104 engages the end of outboardly extending arm 83 of actuating lever 80a, thereby causing it to rotate clockwise about pivot 82a and engage vertical lever 50, which in turn rotates about pivot 52 to urge the wedge into engagement with the brake lever rollers and thereby cause the brake levers to rotate and move their related friction shoes into engagement with the rotor.

At the same time as foot pedal lever 110 is rotating about 112, it urges a first bell crank lever 122, to which it is pivoted by common pivots 112 and 124, the latter pivot pin also being common to push rod 114, to rotate clockwise about pivot 112. As lever 122 rotates, it urges a first link 126 to rotate a second bell crank lever 128 about pivot 130 and thereby move a second link 132 to the right, as seen in FIGURE 10. Link 132 is pivoted to the rearward end of power lever 86a by pivot pin 134 and its movement urges lever 86a to rotate clockwise about pivot 82a.

As pointed out above, the gap between the inboard end of screw 96 and arm 85 of lever 80a prevents lever 86a from engaging arm 85 when the fluid pressure system is in operation, because as piston 104 urges lever 80a to rotate clockwise about common pivot 82a, the forward end of lever 86a chases arm 85 with the result that the actuation of the brake mechanism is achieved solely by hydraulic means. However, in the event of failure of the fluid pressure system, lever 80a will be engaged by lever 86a after the lever has rotated enough to close the gap therebetween. After this takes place, lever 80a and operating lever 50 will then be actuated and will operate the brake levers in the same manner as previously described.

Although the fluid pressure system is intended as the primary braking power source, for purposes of providing a parking brake it is desired to utilize the mechanical linkage system to actuate and set the braking mechanism, because there is always the possibility of pressure fluid leaking from any fluid pressure system and rendering the brake ineffective.

In order to adapt the arrangement for use as a parking brake an override assembly, indicated generally at 136 and illustrated in FIGURE 11, has been provided. The override assembly comprises the previously mentioned push rod 114, which has one end connected to master cylinder piston 116 and which has at the other end a clevis 138 pivotally connected to foot lever 110 and first bell crank lever 122 by common pivot pin 124. A coil compression spring 140, disposed to surround rod 114 is held on the rod by axially spaced spring plates or retainers 142 and 144, the former being threadably engageable with rod 116 and the latter being slidable on the rod. Spring 140 is pre-loaded by means of adjusting nut 146 with the normal pre-load preferably being equal to maximum normal service operating force on push rod 114 in such a manner that under normal service application of the brake, spring 140 will not deflect.

To apply the brake for parking application, foot pedal 108 is depressed by a foot pressure greater than that required for normal service application of the brake. This greater force will compress spring 140 when movement of the master cylinder push rod 114 stops because of the resistance of the friction shoes as they come into contact with the rotor. At this point, a mechanical linkage, illustrated in FIGURE 10, will continue to move until the gap between arm 85, of lever 80a, and lever 86a is closed, thus permitting the brake to be held in applied position by the mechanical system. Foot pedal lever 110 can then be locked in applied position and in desired manner as by means of a dog 148 and rack 150, illustrated in FIGURE 11.

From the above description, it will be apparent that the invention provides a compact and efficient rotor brake arrangement adapted for application to a vehicle as a package unit. The brake is adapted to be generally self-aligning, so as to insure the equalization of braking pressures on opposite faces of the rotor at all times, regardless of the degree of wear of the respective braking elements. Additionally, the brake is designed to permit the actuation of the braking mechanism by either fluid pressure or mechanical means or both, for purposes of safety or when necessary for use as a parking brake.

It will be understood that in order to maintain the gap or lost motion connection between screw 96 and arm 85 of lever 80a at a constant distance regardless of the wear of the shoes, it is necessary to provide both the fluid pressure and mechanical actuation systems with approximately equal mechanical advantages.

I claim:

1. In a brake arrangement for a device, the combination of: a brake mechanism; fluid pressure means operably engageable with the brake mechanism to actuate the same; mechanical means to actuate the brake mechanism; manually operated power means; means connecting the power means to both the fluid pressure actuating means and the mechanical actuating means, said connecting means connecting the power means to the fluid pressure actuating means including a lost motion means allowing the energization of the pressure fluid actuating means and, upon failure of said pressure fluid actuating means, permitting actuation of the mechanical actuating means, said brake mechanism including a pair of dead levers fulcrumed about a common pivotal axis, one of the levers being positioned to be actuated by the fluid pressure actuating means and the other lever being positioned to be actuated by the mechanical actuating means, a second lost motion means including an axially offset portion secured to one of said levers and positioned to be engaged by the other lever only after the mechanically actuated lever has been pivoted a predetermined distance relative to the fluid pressure actuated lever upon failure of said fluid pressure actuating means.

2. A brake arrangement according to claim 1, wherein axially offset portion includes adjustment means to provide for effectively varying the distance between said offset portion and said other lever thereby adjusting the amount of relative rotation of said mechanically actuated lever and said fluid pressure actuated lever before engagement therebetween.

3. In a brake arrangement according to claim 1, wherein said first lost motion means include resilient means interposed between the power means and the fluid pressure actuating means so that the exertion of a predetermined pressure by the power means will energize the fluid pressure actuating means and the exertion of a greater amount of pressure by the power means will energize the mechanical actuating means.

4. In a brake arrangement for a vehicle having a brake mechanism and means to actuate said brake mechanism comprising, in combination: fluid pressure means including a pneumatic cylinder, a power cylinder, and pressure fluid transfer means interconnecting said cylinders for the energization of the latter by the former; an actuating lever operatively interconnecting the power cylinder and the brake mechanism; a power lever fulcrumed about a common pivotal axis with said actuating lever; lost motion means including an offset portion secured to said actuating lever, said lost motion means being positioned to at times be engaged by said power lever; a manually operable brake control lever; yieldable means connecting the control lever to the pneumatic cylinder and mechanical means connecting the control lever to the power lever so that the control lever is operable to actuate the brake mechanism by fluid pressure through the power cylinder and actuating lever or, upon failure of said fluid pressure means, by said mechanical means through the power lever and actuating lever when the power lever has been pivoted a predetermined distance relative to the actuating lever whereby said power lever engages said offset portion so that actuation of the power lever effects actuation of the brake mechanism independently of the fluid pressure means upon failure of the latter.

References Cited in the file of this patent

UNITED STATES PATENTS

| | | |
|---|---|---|
| 343,680 | Tribe | June 15, 1886 |
| 1,723,140 | Dormoy | Aug. 6, 1929 |
| 1,753,370 | Du Pont | Apr. 8, 1930 |
| 1,969,872 | Bowen | Aug. 14, 1934 |
| 2,107,823 | Hallot | Feb. 8, 1938 |
| 2,147,955 | Baits | Feb. 21, 1939 |
| 2,152,022 | Boetto | Mar. 28, 1939 |
| 2,286,517 | Tack | June 16, 1942 |
| 2,406,201 | Coombes | Aug. 20, 1946 |
| 2,497,293 | Cade | Feb. 14, 1950 |
| 2,664,973 | Colley | Jan. 5, 1954 |
| 2,871,713 | House | Feb. 3, 1959 |